US012142814B2

(12) United States Patent
Liu et al.

(10) Patent No.: US 12,142,814 B2
(45) Date of Patent: Nov. 12, 2024

(54) CAVITY-BACKED BEZEL ANTENNA

(71) Applicant: Novocomms Ltd, Birmingham (GB)

(72) Inventors: Qing Liu, Birmingham (GB); Zhenhua Hu, Solihull (GB); Zhilong Miao, Solihull (GB); Xiaobin Jia, Birmingham (GB)

(73) Assignee: Novocomms Ltd, Birmingham (GB)

( * ) Notice: Subject to any disclaimer, the term of this patent is extended or adjusted under 35 U.S.C. 154(b) by 65 days.

(21) Appl. No.: 17/770,935

(22) PCT Filed: Oct. 21, 2020

(86) PCT No.: PCT/GB2020/052647
§ 371 (c)(1),
(2) Date: Apr. 21, 2022

(87) PCT Pub. No.: WO2021/079112
PCT Pub. Date: Apr. 29, 2021

(65) Prior Publication Data

US 2022/0393337 A1 Dec. 8, 2022

(30) Foreign Application Priority Data

Oct. 21, 2019 (GB) ...................................... 1915212

(51) Int. Cl.
*H01Q 1/22* (2006.01)
*H01Q 1/48* (2006.01)
*H01Q 9/30* (2006.01)

(52) U.S. Cl.
CPC ......... *H01Q 1/2266* (2013.01); *H01Q 1/2291* (2013.01); *H01Q 1/48* (2013.01); *H01Q 9/30* (2013.01)

(58) Field of Classification Search
CPC ...... H01Q 1/2266; H01Q 1/2291; H01Q 1/48; H01Q 1/243; H01Q 9/30; H01Q 9/42; H01Q 9/0421; H01Q 19/10
See application file for complete search history.

(56) References Cited

U.S. PATENT DOCUMENTS 10,271,299 B1 * 4/2019 Sayem .................. H04W 64/00
2003/0124985 A1 7/2003 Shin et al.

(Continued)

FOREIGN PATENT DOCUMENTS

JP 2017228982 A * 12/2017 ............ H01Q 13/10
WO 2017127062 A1 7/2017

OTHER PUBLICATIONS

International Search Report and the Written Opinion from International Application No. PCT/GB2020/052647, dated Feb. 24, 2021, 16 pp.

(Continued)

*Primary Examiner* — Hoang V Nguyen
(74) *Attorney, Agent, or Firm* — Shumaker & Sieffert, P.A.

(57) ABSTRACT

There is disclosed an electronic device comprising a front surface including a display screen and a non-metallic bezel surrounding the display screen, and a metallic rear surface. A cavity is defined between the rear surface and the bezel of the front surface along at least a portion of the bezel. The electronic device further comprises a conductive radiating element and a conductive ground plane. The conductive radiating element is mounted in or adjacent to the cavity so as to face the non-metallic bezel in a first direction towards the front surface, and to face the cavity in a second direction towards the rear surface. The conductive radiating element is connected to the conductive ground plane and is additionally connected to the metallic rear surface. The conduc- (Continued)

tive radiating element is configured for excitation by an RF feed, and the cavity serves as a reflector to direct RF signals through the bezel.

20 Claims, 8 Drawing Sheets

(56) References Cited

U.S. PATENT DOCUMENTS

| | | | |
|---|---|---|---|
| 2013/0293424 | A1 | 11/2013 | Zhu et al. |
| 2018/0331415 | A1 | 11/2018 | Wu et al. |

OTHER PUBLICATIONS

International Preliminary Report on Patentability from International Application No. PCT/GB2020/052647, dated Apr. 26, 2022, 9 pp.

* cited by examiner

CAVITY-BACKED BEZEL ANTENNA

The present disclosure relates to an antenna arrangement configured to be incorporated behind a bezel of a portable communications device, such as a laptop or tablet computer, or a mobile handset such as a smartphone.

BACKGROUND

With the current advancement of technology in mobile telecommunications devices such as tablets, laptops and smartphones, the trend is towards supporting more wireless standards, being thinner and more aesthetically desirable.

The desire for thinner devices often requires the use of metal monocoque shells which do not offer good passage of radio frequency (RF) signals from an antenna. This can be a problem for WLAN frequencies (for example, 2.4 GHz and 5 GHz), and when coupled with the antenna being placed in close proximity to a display screen (and associated electronic components), provides a challenge for any antenna design to work effectively.

It is known to use plastic windows in metal covers or shells, in order that RF signals can pass easily, but this can detract from the aesthetic design of the device and is sometimes associated with the less premium models in a range. Other solutions include creating insulated slots in a rim around the casing to create either dipole, or monopole antenna elements such as on the iPhone4 ®. However, these are particularly susceptible to user intervention by shorting across the elements with the hand or fingers during use, which results in degradation of the signal.

Another solution is to use very small antenna arrangements behind the non-metal bezel of the device screen, for example a laptop screen. These types of antenna arrangements are located in the small amount of free space that is bounded by metal casing to the outside and the display screen to the inside, and try to punch a signal through either a slot of non-metal material in the screen back case that is disguised to have a metallic finish, or through a non-metal cover that forms the screen bezel. Prior art solutions where the bezel is relatively large (>10 mm) provides good operation in the WLAN bands of 2.4 and 5.5 GHz. However, performance in these bands can be challenging with the latest models of devices having almost edge-to-edge screens with typical bezel sizes of <10 mm, often <6 mm.

This solution is typically less susceptible to outside intervention by fingers or hands blocking any slot or notch and allows more complex designs of resonating structure to be implemented behind the bezel, which is not feasible using the parts of the casing as radiating elements.

BRIEF SUMMARY OF THE DISCLOSURE

It would be desirable to provide an antenna arrangement, suitable for a portable wireless-capable device, that has a small size (<6 mm) in carrier height and can be placed behind the latest very thin edge-to-edge screen bezels, and can operate sufficiently in the WLAN bands of 2.4 GHz and 5.5 GHz.

Viewed from a first aspect, there is provided an electronic device comprising:

- a front surface including a display screen and a bezel surrounding the display screen, with at least a portion of the bezel being non-metallic;
- a metallic rear surface;
- a cavity defined between the rear surface and the bezel of the front surface along at least the non-metallic portion of the bezel;
- a conductive radiating element; and
- a conductive ground plane;
- wherein the conductive radiating element is mounted in or adjacent to the cavity so as to face the non-metallic portion of the bezel in a first direction towards the front surface, and to face the cavity in a second direction towards the rear surface;
- wherein the conductive radiating element is connected to the conductive ground plane;
- wherein the conductive radiating element is additionally connected to the metallic rear surface; and
- wherein the conductive radiating element is configured for excitation by an RF feed.

Viewed from a second aspect, there is provided an antenna for an electronic device, the antenna comprising:

- a conductive radiating element;
- a conductive ground plane;
- a ground plane extension extending from the conductive ground plane in a direction out of the plane of the conductive ground plane; and
- an RF feed for exciting RF currents in the conductive radiating element;
- wherein the conductive radiating element is connected to the conductive ground plane; and
- wherein the conductive radiating element is additionally provided with a connector for connection to a metallic rear cover of an electronic device.

With regard to the first aspect, the cavity is bounded by the metallic rear surface, metallic parts of the display screen, and/or electronic components on a motherboard or the like mounted behind the display screen. The provision of a cavity, bounded by metallic components, behind the conductive radiating element, helps to direct RF signals excited by the conductive radiating element through the non-metallic bezel on the front surface of the electronic device.

In some embodiments, the conductive radiating element is self-supporting, e.g. be formed from stamped metal sheet or the like. In other embodiments, the conductive radiating element is formed as a conductive antenna pattern on or in an antenna carrier made of a dielectric material. The conductive antenna pattern may be formed on or in the antenna carrier by known processes, such as printing, laser direct structuring (LDS), adhesive wrapping etc.

In embodiments with an antenna carrier, the conductive ground plane may extend from the antenna carrier. The conductive ground plane may extend in a direction generally parallel to the front and rear surfaces.

The conductive radiating element may be connected to the metallic rear surface by direct soldering, conductive foam, a pogo pin, or any suitable connection.

The dual grounding of the conductive radiating element to both the metallic rear surface and the conductive ground plane means that the cavity is defined by a conductive ground plane surface behind the conductive radiating element, helping to direct RF signals excited by the conductive antenna element through the bezel in a direction out of the front surface away from the rear surface.

The metallic rear surface, which is typically a very large (relative to the conductive radiating element) metallic component covering the most or all of the rear of the electronic device, may act as a reflector to help direct radiated RF signals through the bezel of the front surface with improved efficiency and performance.

The conductive radiating element may have an elongate shape. For example, the conductive radiating element may be substantially rectangular or linear. The conductive radiating element may have a first second major edge that faces and is substantially parallel to an adjacent edge of the front surface of the electronic device, and a second major edge that faces and is substantially parallel to an adjacent edge of the display screen. One of the major edges, for example the first major edge, is connected to the metallic rear surface, and the other major edge, for example the second major edge, is connected to the conductive ground plane. The connections of the first and second major edges, in combination with the extent of the metallic rear surface and the conductive ground plane, optionally together with other conductive components such as the display screen and/or a motherboard or battery component, help to define the grounded cavity behind the conductive radiating element.

The antenna carrier may be shaped or curved so as to conform to the reduced space available in electronic devices where the front and/or rear surfaces converge towards each other at their edges.

The antenna carrier may be disposed with a portion overlapped by the display screen, provided that the conductive antenna pattern on the antenna carrier is not overlapped by the display screen. The RF feed may be overlapped by the display screen.

The RF feed may be located on the ground plane extension. In some embodiments, the RF feed may excite the conductive radiating element by RF coupling; in other embodiments, the RF feed may be directly connected to the conductive radiating element.

The cavity may have a depth of 2 mm to 10 mm, preferably 2 mm to 6 mm, and in some embodiments 3 mm to 4 mm, for example 3.5 mm.

The cavity may have a height of at least 4 mm, at least 4.2 mm, at least 6 mm, or at least 8 mm.

The antenna carrier may have a thickness of 1 mm to 5 mm, preferably around 2 mm.

The antenna carrier may have a height of less than 10 mm, less than 6 mm, preferably less than 4 mm, for example around 3.5 mm.

The distance between the first and second major edges of the conductive radiating element may be less than 10 mm, less than 6 mm, preferably less than 4 mm, for example around 3.5 mm. The distance between the first and second major edges of the conductive radiating element is dictated by the width of the bezel, which in modern electronic device designs can be as little as 3.5 mm.

BRIEF DESCRIPTION OF THE DRAWINGS

Embodiments of the invention are further described hereinafter with reference to the accompanying drawings, in which.

DETAILED DESCRIPTION

Figure 1:
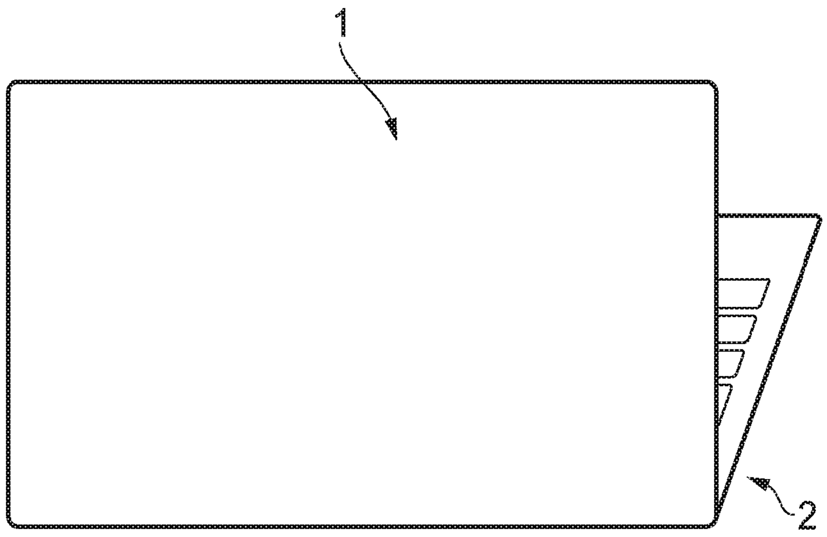
FIG. 1 shows a rear elevation of a clamshell laptop device.
Figure 2:
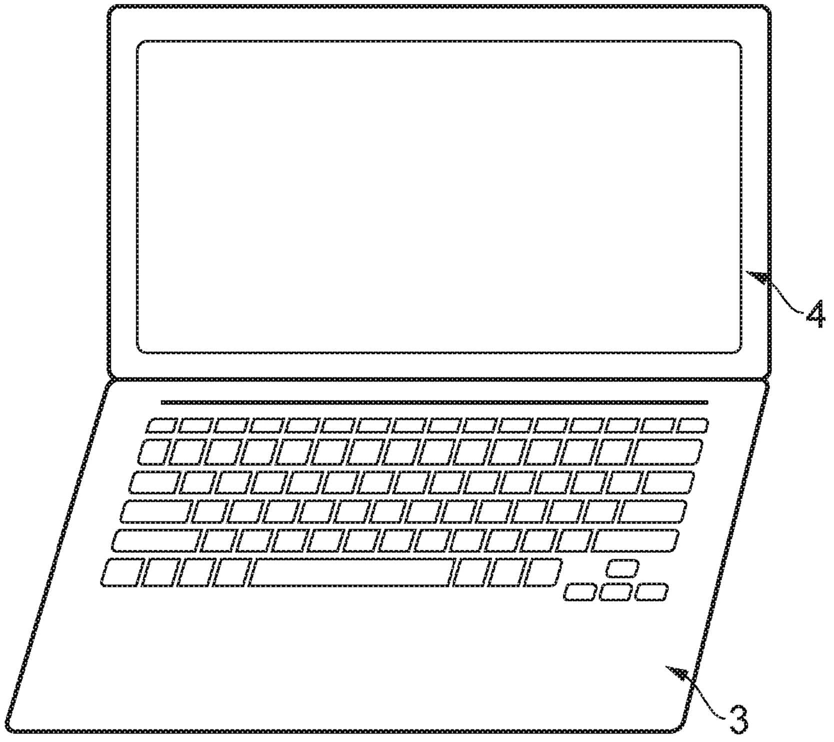
FIG. 2 shows a front elevation of a clamshell laptop device.

An embodiment of the present disclosure may be described in relation to a typical clamshell design laptop computer. FIG. 1 illustrates such a laptop, from a rear elevation, with the casing comprising different covers. In the industry, the cover on the back of the screen is denoted the A-cover (1) and the cover underneath the laptop that contacts the surface upon which the device sits is denoted the D-cover (2). FIG. 2 shows the same laptop from a front elevation, and comprises the screen front cover, including the bezel, which is denoted the B-cover (4). Finally, the cover that surrounds the keyboard is denoted the C-cover (3).

Another embodiment may be described in relation to a typical tablet or convertible tablet that can dock with a keyboard. In this embodiment the main device will only have the A and B covers in the tablet mode. In addition the motherboard and battery will be housed behind the screen to form an all-in-one unit.

Figure 3:
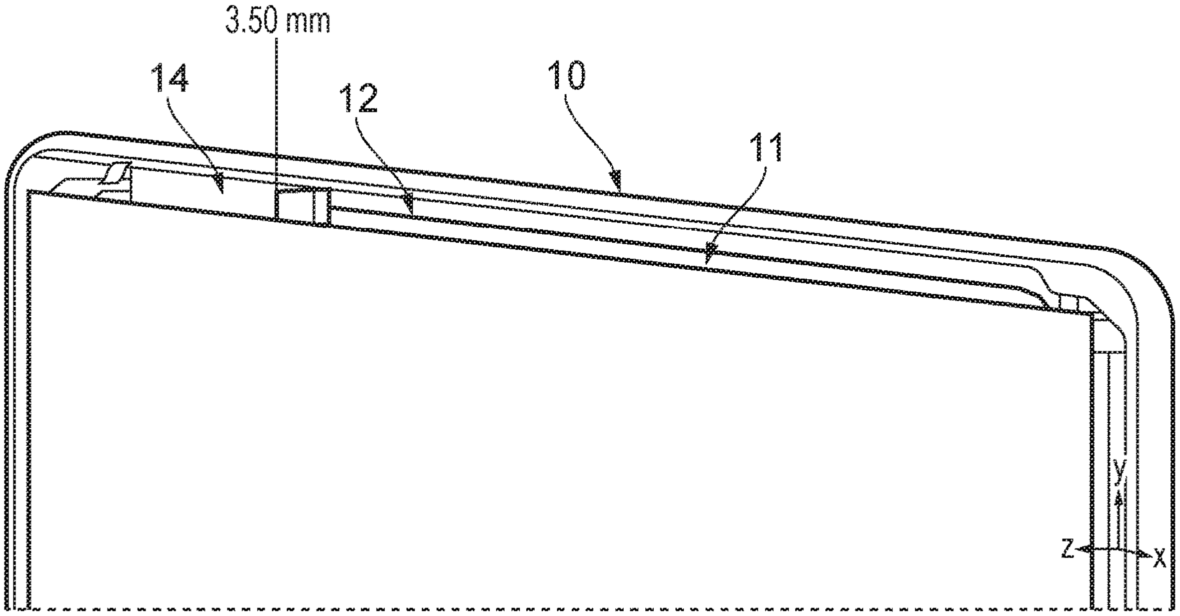
FIG. 3 shows a front elevation of a laptop screen section with the B-cover removed.

FIG. 3 shows a closer view of the screen section of a laptop computer comprising the screen back A-cover (10), the screen unit (11), the compact cavity (12), and the antenna carrier in position (14). The cavity is formed where the screen and/or motherboard and battery units end and the curvature or remaining length of the case folds around to complete the A-cover shape. This cavity enables a well-designed antenna and antenna carrier to be positioned in this region. The screen and/or motherboard and battery devices are typically all grounded to the metal A-cover.

The cavity region has a maximum height space, defined as the gap between the screen edge and the region where the A-cover folds around and accepts the B-cover of less than 10 mm, typically less than 6 mm, and with the very latest edge-to-edge screens, less than 5 mm. In this particular embodiment the antenna carrier has a height of 3.50 mm to fit within the cavity curvature, and is rectangular, however it should be understood that the carrier can be other shapes such as curved to properly fit the curvature, or other shapes as demanded by the antenna operating parameters.

Figure 4:
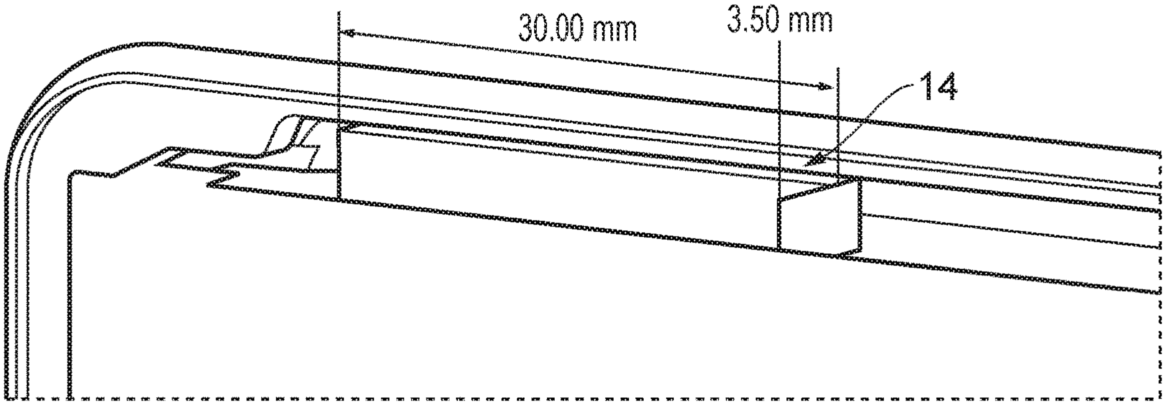
FIG. 4 shows a detailed front elevation of a laptop screen section with the B-cover removed.

FIG. 4 shows another, closer view of the laptop screen region, also with the B-cover removed. This illustrates the antenna dimensions in greater detail with a height of 3.50 mm and a length of 30.00 mm. In this embodiment the carrier is placed towards the left hand side of the device, however this could be anywhere along the edge of the screen depending on the placement of RF noisy components, other antennas or ease of cable routing to the RF cards in the particular device platform.

Figure 5:
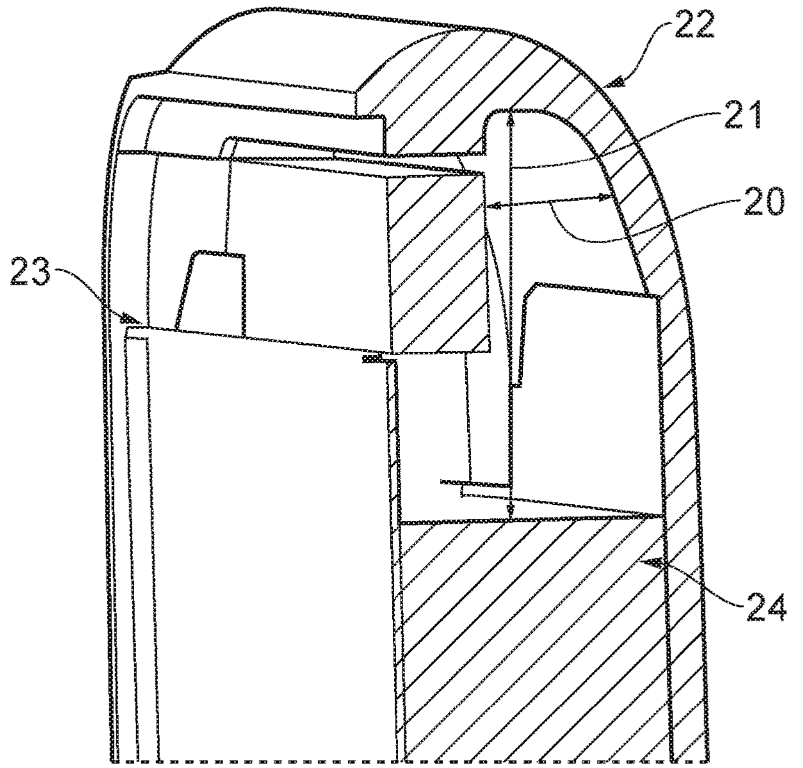
FIG. 5 shows a side elevation of the antenna and carrier.

FIG. 5 shows a side elevation of the laptop screen section with the B-cover removed. FIG. 5 shows the available space in the cavity in more detail. The screen (23) and the curvature of the A-cover (22) create a cavity that is approximately 3.5 mm deep (20) at the mid-point of the curvature. The cavity may have a height (21) greater than 8.0 mm, preferably greater than 6.0 mm, or more preferably greater than 4.2 mm. For obvious reasons, the antenna carrier cannot be placed behind the screen unit as the metallic back, in the case of a laptop, or the laptop/motherboard/battery unit in the case of a tablet or convertible, would block any signal and impede the antenna.

In this particular embodiment the carrier is designed to sit neatly above the screen unit and leave space behind by using dimensions of 3.5 mm height and a thickness of 2.0 mm. In some cases, a portion of the antenna carrier could be placed behind the screen unit, but no active radiating elements would be able to be placed on the eclipsed part of the carrier face. This would have to support non-active elements such as a feed or passive coupled components that do not radiate.

Figure 6:
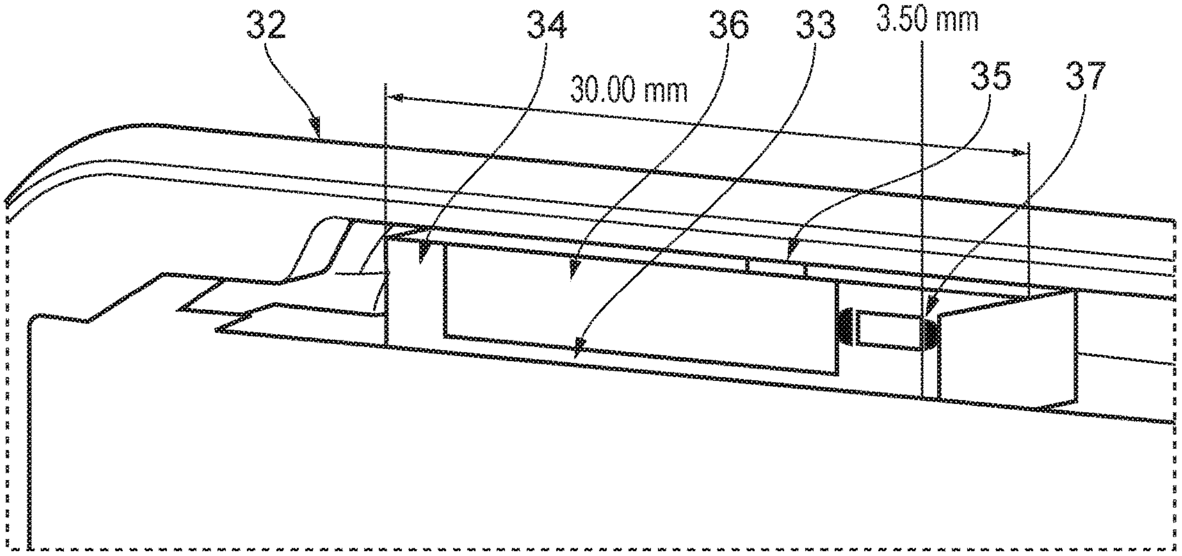
FIG. 6 shows a detailed front elevation of the antenna and carrier.

FIG. 6 shows a front elevation detailed view of the antenna and carrier (34) in-situ above the screen unit (33), with the device B-cover removed. The antenna carrier has metallisation in the form of a patch, or other patterns to form the radiating structure (36) operable in the WiFi® frequency bands. The antenna device also has feeding structures (37) to supply RF energy to and from the radiating structure and interface with the coaxial leads from the wireless card in the device. The antenna patch or metallisation pattern structure (36) is directly connected to the metallic A-cover by connection (35); this connection can be made via conductive foam, pogo-pin, or directly soldered in place during device assembly.

Figure 7:
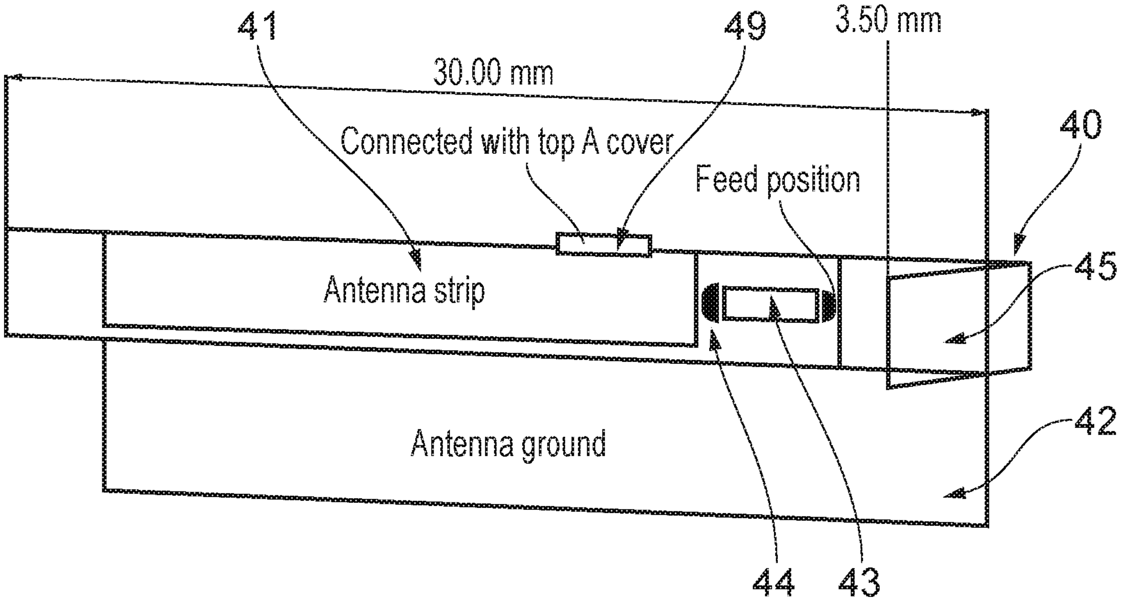
FIG. 7 shows a detailed view of the antenna and feed according to an embodiment.

FIG. 7 shows a more detailed view of an antenna and carrier arrangement according to an embodiment. The carrier (40) is substantially rectangular in shape but could be other conforming shapes made to fit the curvature of the A-cover. The carrier is typically RF transparent plastic material such as ABS and the antenna pattern (41) comprises the metallic patch or meander-line or other pattern to create the required resonances for WiFi® at 2.4 and 5.5 GHz. The antenna metal pattern can be manufactured using techniques well known in the antenna industry such as laser direct structuring (LDS) or metal-stamping. It should also be noted that the antenna pattern need not be confined to one side of the carrier, and in some circumstances, depending on performance requirements, or placement of other metal components; the antenna can be formed on more than one side of the carrier.

As described earlier, the antenna pattern (41) is connected to the device A-cover through connection point (49). This connection can be conductive foam, pogo pin, or directly soldered. The grounding of this relatively compact antenna arrangement is important, the bottom and top connections to ground create a cavity formed from the metallic A-cover, the screen unit and/or the motherboard/battery elements (24). This cavity, illustrated in FIG. 5 with dimensions of approximately 3.5 mm (20) by 6.0 mm (21), behind the antenna and carrier arrangement, creates a cavity-backed antenna effect which further ensures that the RF energy is directed towards the RF-transparent B-cover bezel in order to radiate and provide the performance and efficiency required.

The antenna arrangement has a large ground plane (42) extending from the bottom of the carrier, with a ground plane extension (45) connected to the large main ground and extending onto the carrier. The ground plane can be stamped metal or foil extending from the carrier bottom edge, and ground plane extension can be formed using LDS or metal stamping during the normal antenna pattern processing. The ground plane is then connected to the screen/motherboard/battery section in the device, which is the main device ground point.

The antenna is fed from the feed (43) arrangement located at one end of the carrier and located on a ground plane extension (45) to enable easier cable routing and connection of coaxial cable through soldering. In this particular embodiment the antenna is directly fed and has passive components (44) placed in the feed to tune the required resonances. Other feed arrangements could include a more active arrangement comprising passive components and RF switched to actively tune or match the antenna in the required frequency ranges.

Figure 8:
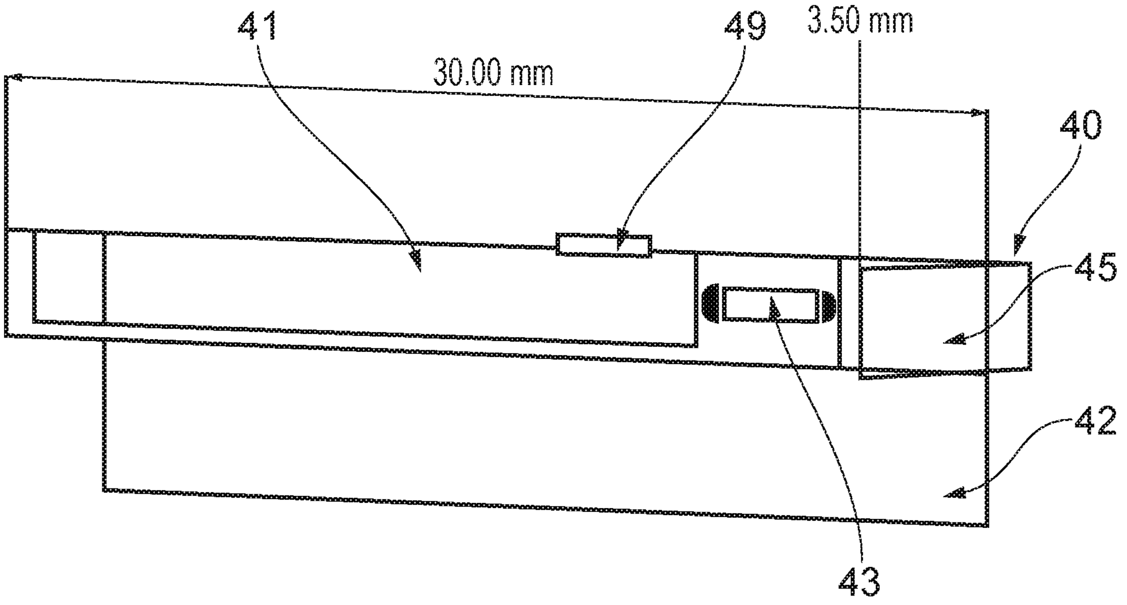
FIG. 8 shows a detailed view of the antenna and feed according to an embodiment.

FIG. 8 shows a detailed view of the antenna and feed according to an embodiment. The arrangement comprises the carrier (40), the antenna pattern (41), ground plane (42) and associated ground plane extension (45). The feed arrangement (43) in this embodiment is direct from the groundplane extension (45) to the antenna pattern (41).

Figure 9:
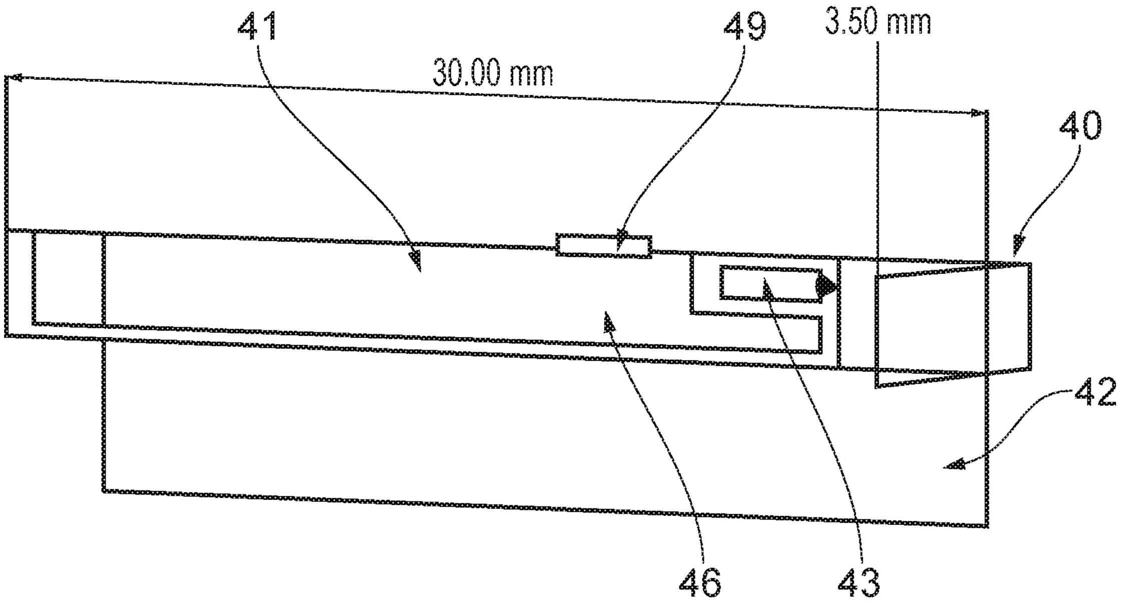
FIG. 9 shows a detailed view of the antenna and feed according to an embodiment.

FIG. 9 shows a detailed view of the antenna and feed according to an embodiment. The arrangement comprises the carrier (40), the antenna pattern (41), ground plane (42) and associated ground plane extension (45). The feed arrangement in this embodiment utilises coupling. The feed arrangement (43) is situated in close proximity to an extended coupling portion (46) of the antenna pattern (41) in order that RF energy presented at the feed can couple with the extension portion (46) and induce RF energy in the antenna pattern radiating structure, and vice versa for receive mode.

Figure 10:
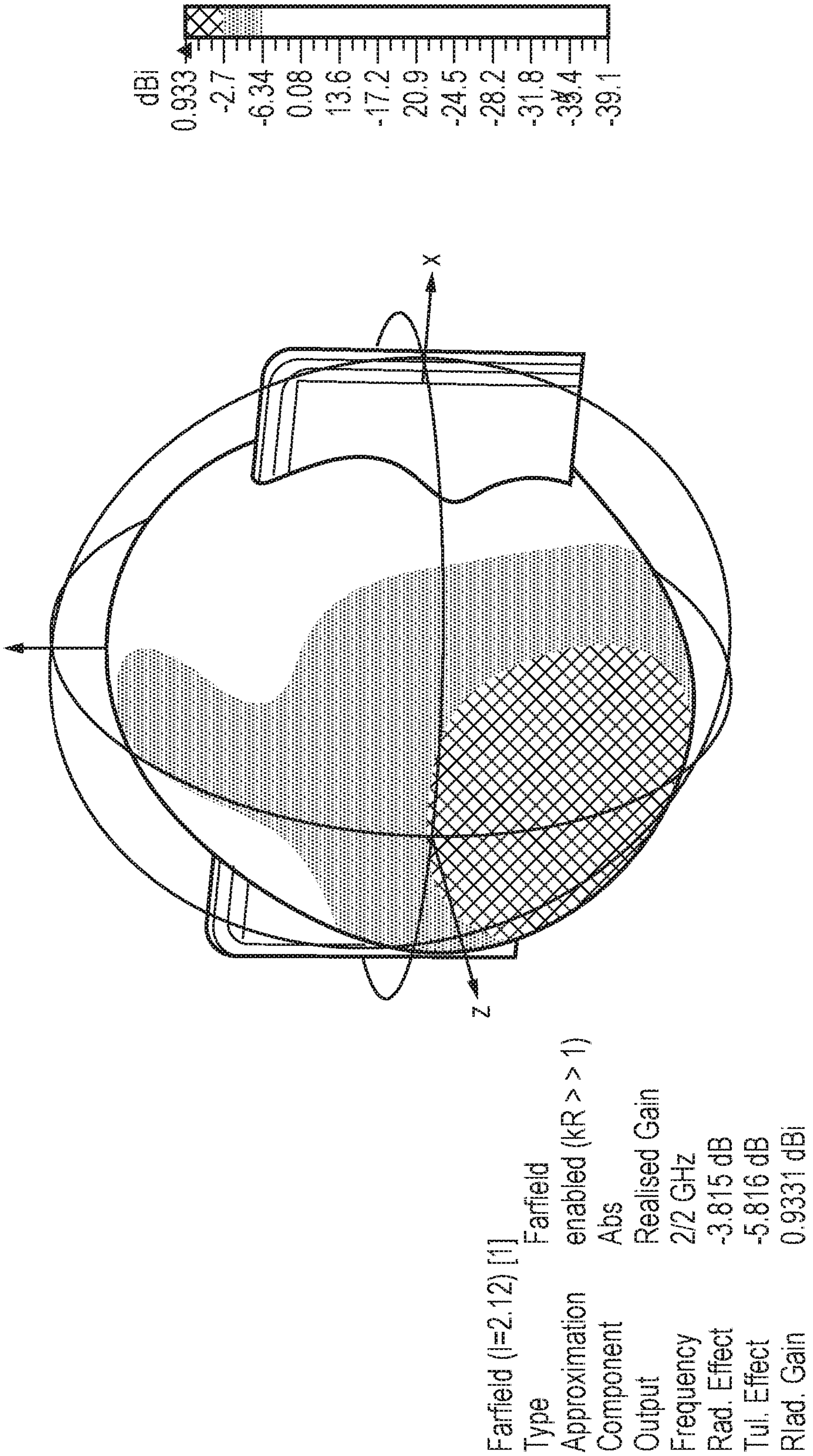
FIG. 10 shows a simulated far-field main lobe radiation pattern at 2.4 GHz.

FIG. 10 shows the simulated main lobe far-field radiating pattern at 2.4 GHz. This plot clearly indicates the main radiation emerges from the front of the device, through the B-cover bezel.

Figure 11:
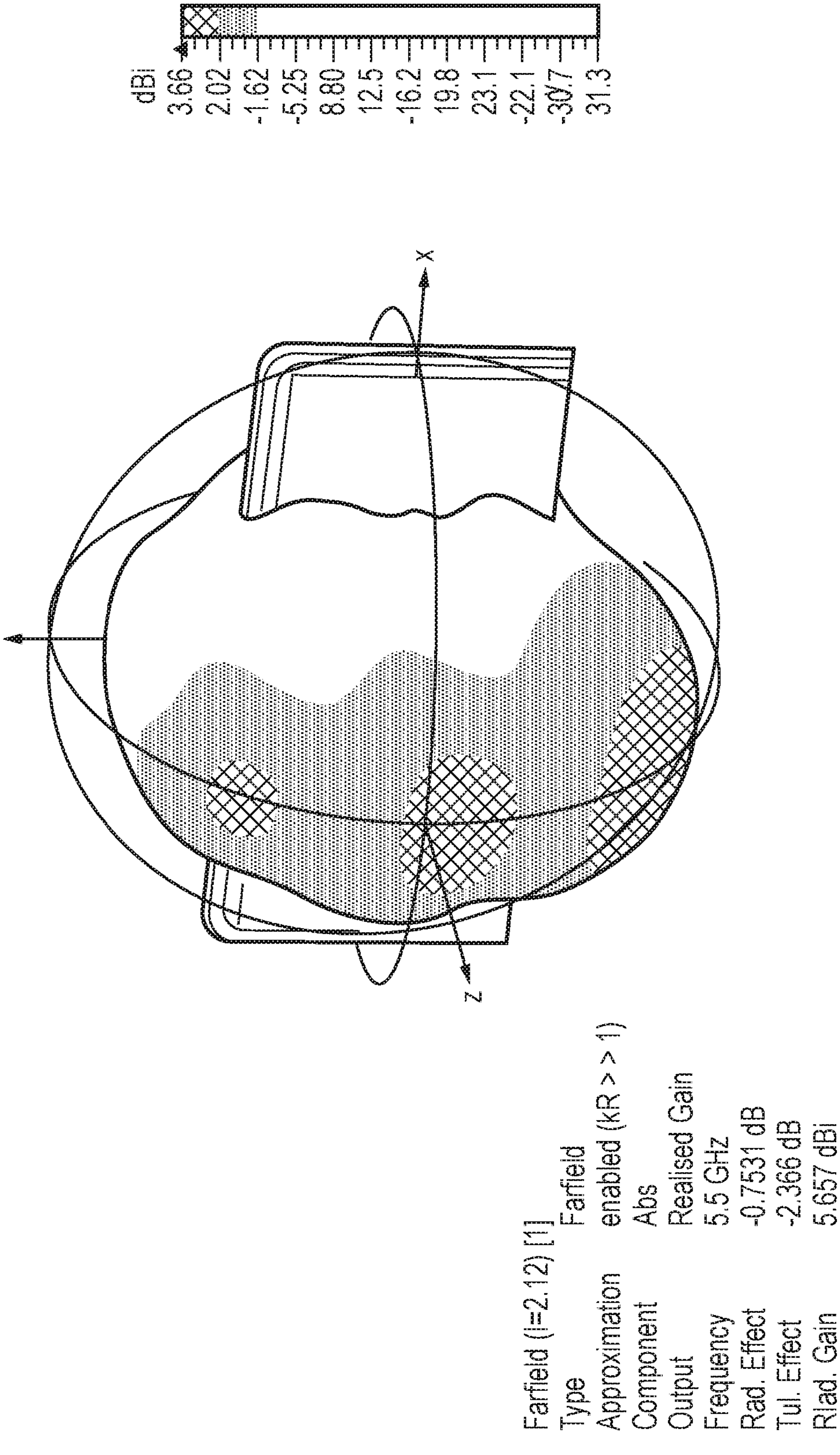
FIG. 11 shows a simulated far-field main lobe radiation pattern at 5.5 GHz.

FIG. 11 shows the simulated main lob far-field radiating pattern at 5.5 GHz. This plot also clearly indicates the main radiation emerging from the front of the device, through the B-cover bezel.

Figure 12:
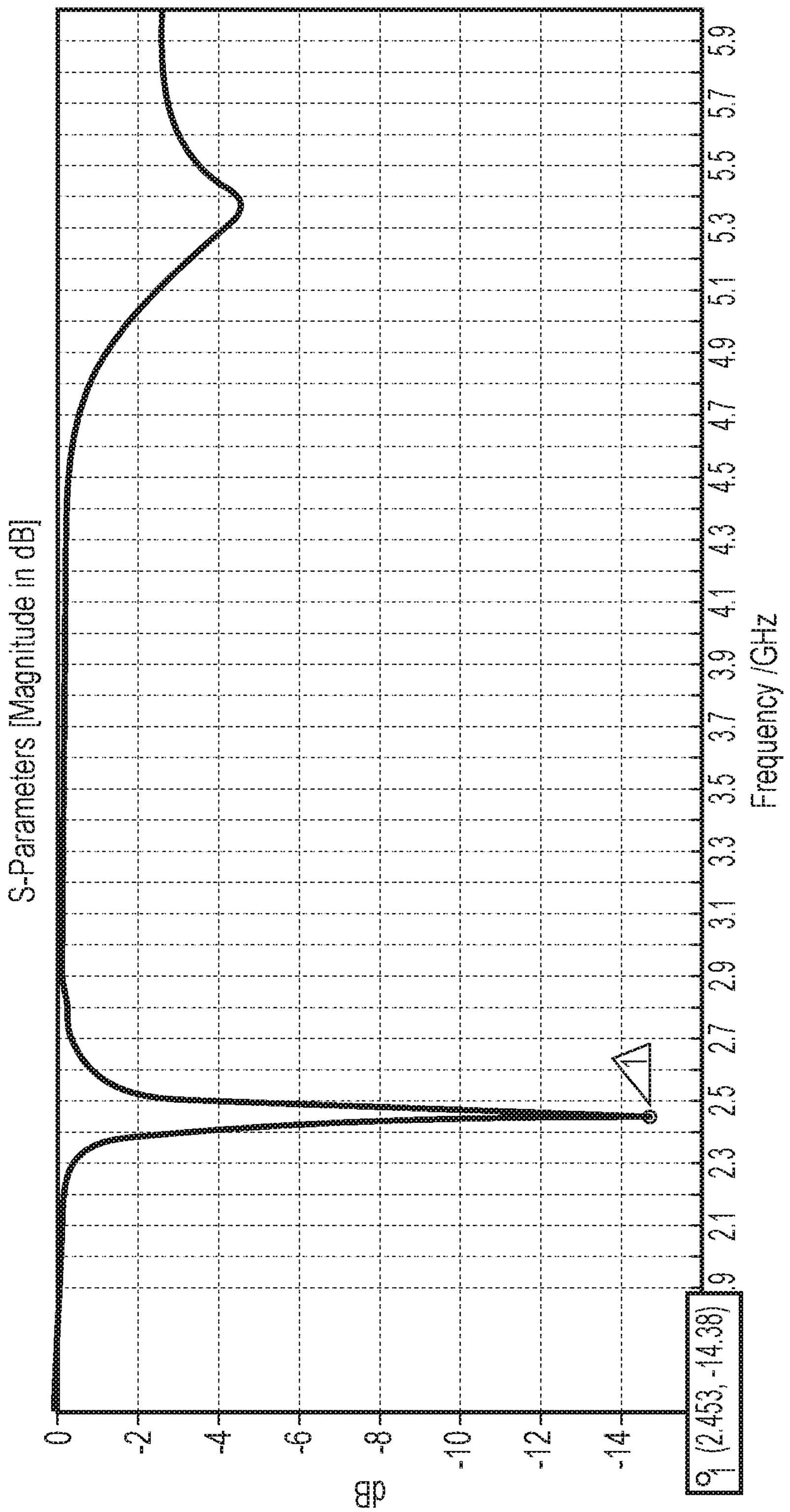
FIG. 12 shows the simulated S-Parameter plot.

FIG. 12 shows the simulated S-Parameter plot of the antenna performance. This plot indicates the simulated return loss of the antenna across the operating frequency range. Ideally one would want deep drops in return loss, as a result of radiation being transmitted rather than reflected in the system. Such resonant responses are indicated at 2.4 GHz and 5.5 GHz as required by the WiFi® frequencies.

Throughout the description and claims of this specification, the words "comprise" and "contain" and variations of them mean "including but not limited to", and they are not intended to (and do not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. An electronic device comprising:

a front surface including a display screen and a bezel surrounding the display screen, with at least a portion of the bezel being non-metallic;

a metallic rear surface;

a cavity defined between the rear surface and the bezel of the front surface along at least the non-metallic portion of the bezel;

a conductive radiating element; and a conductive ground plane;

wherein the conductive radiating element is mounted in or adjacent to the cavity so as to face the non-metallic portion of the bezel in a first direction towards the front surface, and to face the cavity in a second direction towards the rear surface;

wherein the conductive radiating element is connected to the conductive ground plane;

wherein the conductive radiating element is additionally connected to the metallic rear surface; and wherein the conductive radiating element is configured for excitation by an RF feed.

2. The electronic device as claimed in claim 1, wherein the conductive radiating element is self-supporting.

3. The electronic device as claimed in claim 1, wherein the conductive radiating element is formed as a conductive antenna pattern on or in a dielectric antenna carrier.

4. The electronic device as claimed in claim 3, wherein the conductive ground plane extends from the dielectric antenna carrier.

5. The electronic device as claimed in claim 3, wherein the antenna carrier is disposed with a portion overlapped by the display screen, provided that the conductive antenna pattern on the antenna carrier is not overlapped by the display screen.

6. The electronic device as claimed in claim 5, wherein the RF feed is disposed on a portion of the antenna carrier that is overlapped by the display screen.

7. The electronic device as claimed in claim 1, wherein the conductive radiating element has an elongate shape, or is substantially rectangular or linear.

8. The electronic device as claimed in claim 1, wherein the conductive radiating element has a first major edge that faces and is substantially parallel to an adjacent edge of the front surface of the electronic device, and a second major edge that faces and is substantially parallel to an adjacent edge of the display screen.

9. The electronic device as claimed in claim 8, wherein one of the first and second major edges is connected to the metallic rear surface and the other of the first and second major edges is connected to the conductive ground plane.

10. The electronic device as claimed in claim 9, wherein the connections of the first and second major edges to the metallic rear surface and to the conductive ground plane, together with the metallic rear surface and the conductive ground plane, define the cavity as a grounded cavity between the conductive radiating element and the metallic rear surface, the grounded cavity configured to direct RF signals through the non-metallic portion of the bezel.

11. The electronic device as claimed in claim 1, wherein the conductive ground plane extends substantially parallel to the front surface and the rear surface.

12. The electronic device as claimed in claim 1, wherein the conductive ground plane is provided with a ground plane extension that extends in a direction out of the plane of the conductive ground plane.

13. The electronic device as claimed in claim 12, wherein the RF feed is disposed on the ground plane extension.

14. An antenna for an electronic device, the antenna comprising:

a conductive radiating element;

a conductive ground plane;

a ground plane extension extending from the conductive ground plane in a direction out of the plane of the conductive ground plane; and an RF feed for exciting RF currents in the conductive radiating element;

wherein the conductive radiating element is connected to the conductive ground plane; and wherein the conductive radiating element is additionally provided with a connector for connection to a metallic rear cover of an electronic device.

15. The antenna as claimed in claim 14, wherein the conductive radiating element is self-supporting.

16. The antenna as claimed in claim 14, wherein the conductive radiating element is formed as a conductive antenna pattern on or in a dielectric antenna carrier.

17. The antenna as claimed in claim 16, wherein the conductive ground plane extends from the dielectric antenna carrier.

18. The antenna as claimed in claim 14, wherein the conductive radiating element has an elongate shape, or is substantially rectangular or linear.

19. The antenna as claimed in claim 14, wherein the conductive radiating element has a first and second opposed and substantially parallel major edges, and wherein one of the first and second major edges is provided with the connector for connection to the metallic rear cover and the other of the first and second major edges is connected to the conductive ground plane.

20. The antenna as claimed in claim 14, wherein the RF feed is disposed on the ground plane extension.

* * * * *